(No Model.) 2 Sheets—Sheet 1.
T. BASSFORD.
WHEEL TIRE.
No. 580,480. Patented Apr. 13, 1897.
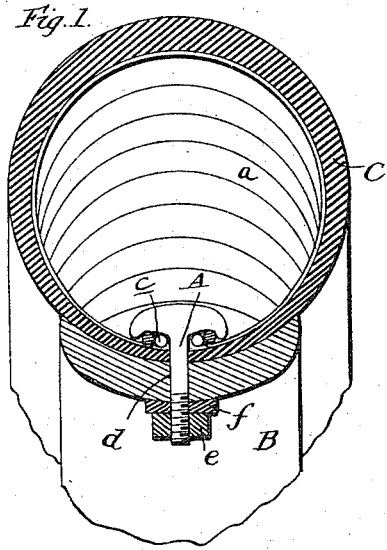
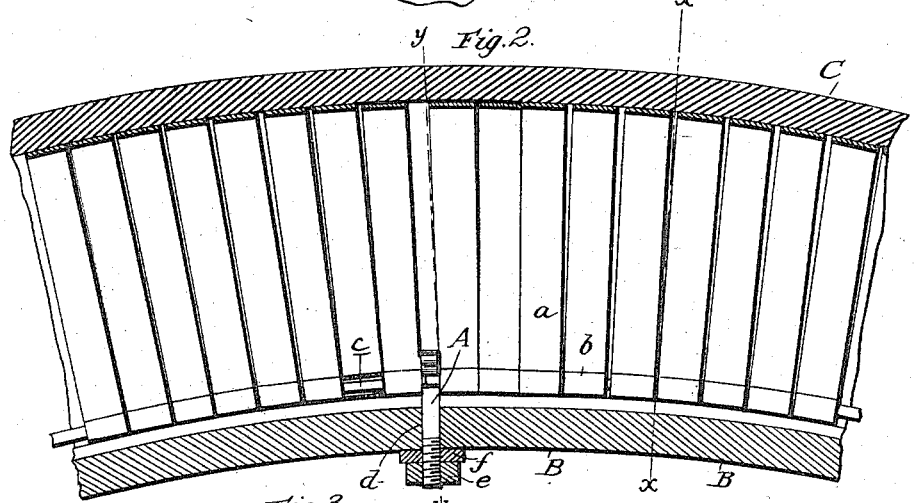
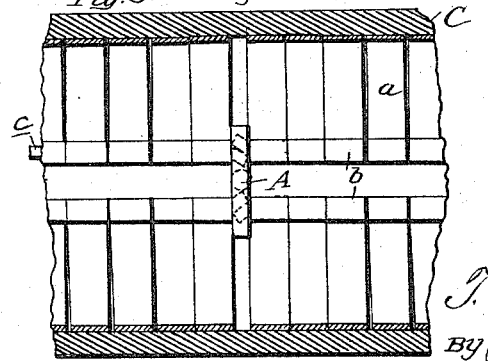
Witnesses:
Inventor
T. Bassford
By James J. Sheehy
Attorney (No Model.)  2 Sheets—Sheet 2.

T. BASSFORD.
WHEEL TIRE.

No. 580,480. Patented Apr. 13, 1897.

Witnesses:

Inventor
T. Bassford
By James Sheehy
Attorney

UNITED STATES PATENT OFFICE.

THOMAS BASSFORD, OF ST. THOMAS, CANADA, ASSIGNOR OF TWO-THIRDS TO WILLIAM M. LAHEY, OF SAME PLACE, AND JOHN LAHEY, OF DETROIT, MICHIGAN.

WHEEL-TIRE.

SPECIFICATION forming part of Letters Patent No. 580,480, dated April 13, 1897.

Application filed February 5, 1897. Serial No. 622,147. (No model.)

*To all whom it may concern:*

Be it known that I, THOMAS BASSFORD, a citizen of Canada, residing at St. Thomas, in the county of Elgin, Province of Ontario, and Dominion of Canada, have invented certain new and useful Improvements in Wheel-Tires; and I do declare the following to be a full, clear, and exact description of the invention, such as will enable others skilled in the art to which it appertains to make and use the same.

This invention relates to improvements in tires for the wheels of bicycles and other foot-propelled machines, but may be advantageously used on buggies and other vehicles. The novelty and many advantages of the invention will appear from the following description and claims when taken in connection with the annexed drawings, in which—

Figure 4:
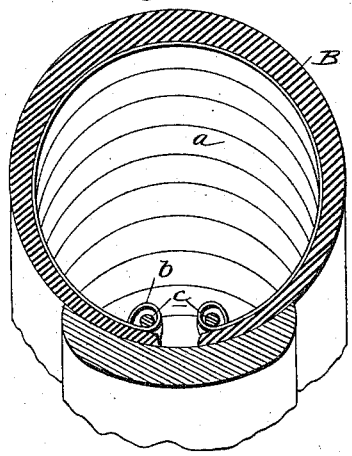
Figure 5:
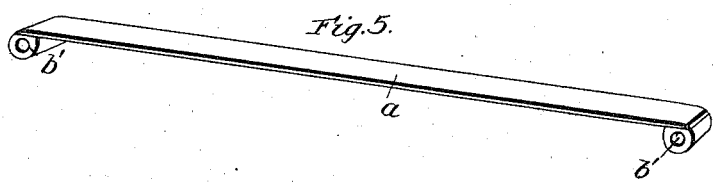
Figure 6:
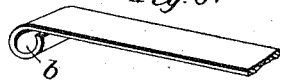
Figure 7:

Figure 1 is a cross-sectional perspective view of a tire constructed according to my improvements. Fig. 2 is a longitudinal sectional view of the same. Fig. 3 is a sectional view taken in a plane at right angles to Fig. 2. Fig. 4 is a cross-sectional perspective view taken at a different point from that shown in Fig. 1. Fig. 5 is a perspective view of a modification of one of the springs. Fig. 6 is a perspective sectional view of one of the springs, and Fig. 7 is a similar view of a modification.

In carrying out my invention I take strips or tapes of spring metal sufficiently light and strong and cut them to the desired length and width. These strips $a$ I provide at each end with an eye $b$. These eyes may be formed by turning the ends of the strips in a rolled manner, as shown, or they may be formed by soldering or brazing an eye $b'$ to the under side at each end of said strips. After thus providing the strips or bands with eyes I spring the same upon rod $c$, there being one rod provided for each end of the strips. A securing-bolt A is provided for connecting the wires $c$, and this bolt has a T-head, preferably curved on the under side of its branches, as shown, so as to serve more effectively in retaining the wires and consequently the eyed ends of the spring-strips, which are bowed prior to being placed beneath the branches or head of the T-bolt. This bolt has a threaded stem, as shown, which is designed to take through the hole $d$ in the wheel-rim B, and a securing-nut $e$ is placed on said threaded stem, whereby the head of the bolt may be driven firmly against the rim or such covering as may be employed for the springs with the ends of the rods interposed. A washer or plate $f$ is preferably employed and arranged between the wheel-rim and securing-nut.

The rim or felly B may be of any suitable construction, and the securing-bolts may take through a hole or aperture therein, such as at present used for the passage of the inflating-tube in pneumatic tires.

A rubber C or other suitable flexible covering may be employed for the springs, and, if desired, the wheel may be provided with a tube for the attachment of a pump, whereby air may be forced into the hollow tire and used both as a spring or cushion and also a pneumatic tire.

The strips, which are preferably spring-steel, are arranged upon the rods so that the edges of said springs will touch or come quite close together, yet allowing each spring free and independent movement.

A tire thus constructed may be cheaply manufactured, it is very light and yielding, and should any one or more of the springs become impaired or injured they can be readily removed and replaced by another or others.

In the modification shown in Fig. 7 of the drawings I have illustrated the rod at one end of the spring as soldered or brazed thereto. In this construction I avoid the turning of an eye on the spring, which in some cases may be very desirable.

Having thus described my invention, what I claim is—

A wheel-tire comprising a series of spring-metal strips having an eye at each end, rods passing through said eyes, a T-headed bolt with the branches of its head engaging the rods so as to hold the ends of the springs close to each other; in combination with a wheel-rim or felly, and a nut for securing the bolt to the felly and consequently the tire thereto, and a covering for the springs, substantially as specified.

In testimony whereof I have hereunto set my hand and affixed my seal, at St. Thomas, in the county of Elgin and Province of Ontario, Canada, this 25th day of January, 1897.

THOMAS BASSFORD. [L. S.]

In presence of—
  E. WILBER HONSINGER,
  D. D. LONG.